United States Patent [19]

Genise

[11] Patent Number: 5,651,292
[45] Date of Patent: Jul. 29, 1997

[54] SPLITTER SHIFT MECHANISM AND CONTROL

[75] Inventor: Thomas A. Genise, Dearborn, Mich.

[73] Assignee: Eaton Corporation, Cleveland, Ohio

[21] Appl. No.: 649,827

[22] Filed: Apr. 30, 1996

[51] Int. Cl.[6] .................................................. F16H 3/08
[52] U.S. Cl. .......................... 74/745; 74/339; 192/69.7; 192/69.91
[58] Field of Search .......................... 192/69.91, 69.7, 192/108; 74/745, 339

[56] References Cited

U.S. PATENT DOCUMENTS

| | | | |
|---|---|---|---|
| 3,429,202 | 2/1969 | Galicher . | |
| 4,290,515 | 9/1981 | Bogema et al. | 192/53 C |
| 4,375,172 | 3/1983 | Richards et al. | 74/339 |
| 4,440,037 | 4/1984 | Foxton et al. | 74/331 |
| 4,455,883 | 6/1984 | Radcliffe | 74/475 |
| 4,561,325 | 12/1985 | Jester | 74/745 |
| 4,663,725 | 5/1987 | Truckenbrod et al. | 364/505 |
| 4,754,665 | 7/1988 | Vandervoort | 74/745 |
| 4,920,815 | 5/1990 | Reynolds | 74/335 |
| 5,052,535 | 10/1991 | Vandervoort et al. | 192/67 |
| 5,054,591 | 10/1991 | Braun | 74/745 |
| 5,193,410 | 3/1993 | Stine et al. | 74/336 |
| 5,268,145 | 12/1993 | Davis | 192/67 R |
| 5,272,939 | 12/1993 | Markyvech et al. | 74/866 |
| 5,335,566 | 8/1994 | Genise et al. | 477/124 |
| 5,370,013 | 12/1994 | Reynolds et al. | 74/330 |
| 5,390,561 | 2/1995 | Stine | 74/331 |

*Primary Examiner*—Dirk Wright
*Attorney, Agent, or Firm*—Howard D. Gordon

[57] ABSTRACT

A splitter-type compound transmission (110) is provided with a splitter clutch (180) having increased backlash and a three-position actuator (202) controlled by a microprocessor-based controller (222). The controller will receive inputs for various sensors including a sensor indicating the position of a manual splitter selector switch (218).

9 Claims, 3 Drawing Sheets

SPLITTER SHIFT MECHANISM AND CONTROL

BACKGROUND OF THE INVENTION

This application is related to co-pending U.S. Ser. No. 08/597,304 filed Feb. 6, 1996, entitled THREE-POSITION ACTUATOR PISTON ASSEMBLY AND ACTUATOR SYSTEM UTILIZING SAME and assigned to EATON CORPORATION, the assignee of this application.

1. Field of the Invention

The present invention relates to two-position shifting mechanisms and, in particular, splitter shifting mechanisms and controls for compound splitter-type transmissions and, more particularly, to splitter shifting mechanisms including a non-synchronized splitter clutch having increased backlash and a three-position splitter clutch actuator.

2. Description of the Prior Art

Compound change-gear transmissions of the splitter type and of the combined range-and-splitter type are well known in the prior art, as may be seen by reference to U.S. Pat. Nos. 4,290,515; 4,440,037; 4,754,665; 5,193,410; 5,272,939; 5,335,566; 5,368,145; 5,370,013 and 5,390,561, the disclosures of which are incorporated herein by reference.

The prior art splitter shift mechanisms typically included manually controlled two-position devices allowing selection of engagement of either a splitter-high or a splitter-low ratio, but not a splitter-neutral position. The prior art splitter shift mechanisms also typically utilized splitter jaw clutches having a relatively low backlash, as a true neutral position was not selectable, which provided a ratchet action (i.e., "buzzing") type of neutral if splitter shifts were attempted at sufficiently non-synchronous conditions to cause harsh shifting.

While widely used and commercially successful, the prior art splitter shifting mechanisms were not totally satisfactory, as the splitter clutches could be subject to undue wear and shifts outside of normally acceptable non-synchronous conditions could not be executed and completed if desirable.

SUMMARY OF THE INVENTION

According to the present invention, the drawbacks of the prior art are minimized or overcome by the provision of a splitter shifting mechanism and control which includes a three-position splitter actuator allowing a maintainable splitter-neutral position, a non-synchronized splitter jaw clutch having greatly increased backlash, and a controller for sensing vehicle operating conditions, including manual or automatic selection of a splitter shift, and for issuing command signals to the splitter actuator. By providing a neutral position and a controller for controlling when the splitter jaw clutch is caused to engage, the splitter jaw clutch backlash may safely open up to a degree that almost any attempted engagement will be completed without buzzing.

While the controller will normally cause splitter jaw clutch engagement to occur under conditions which will result in a smooth shift, if vehicle conditions warrant a harsh engagement, the controller will initiate same, and the large backlash jaw clutches will allow successful, although harsh, engagement to occur.

Accordingly, it is an object of the present invention to provide a new and improved splitter shifting mechanism and control.

This and other objects and advantages of the present invention will become apparent from a reading of the following description of the preferred embodiment taken in connection with the attached drawings.

DESCRIPTION OF THE PREFERRED EMBODIMENT

Figure 1:
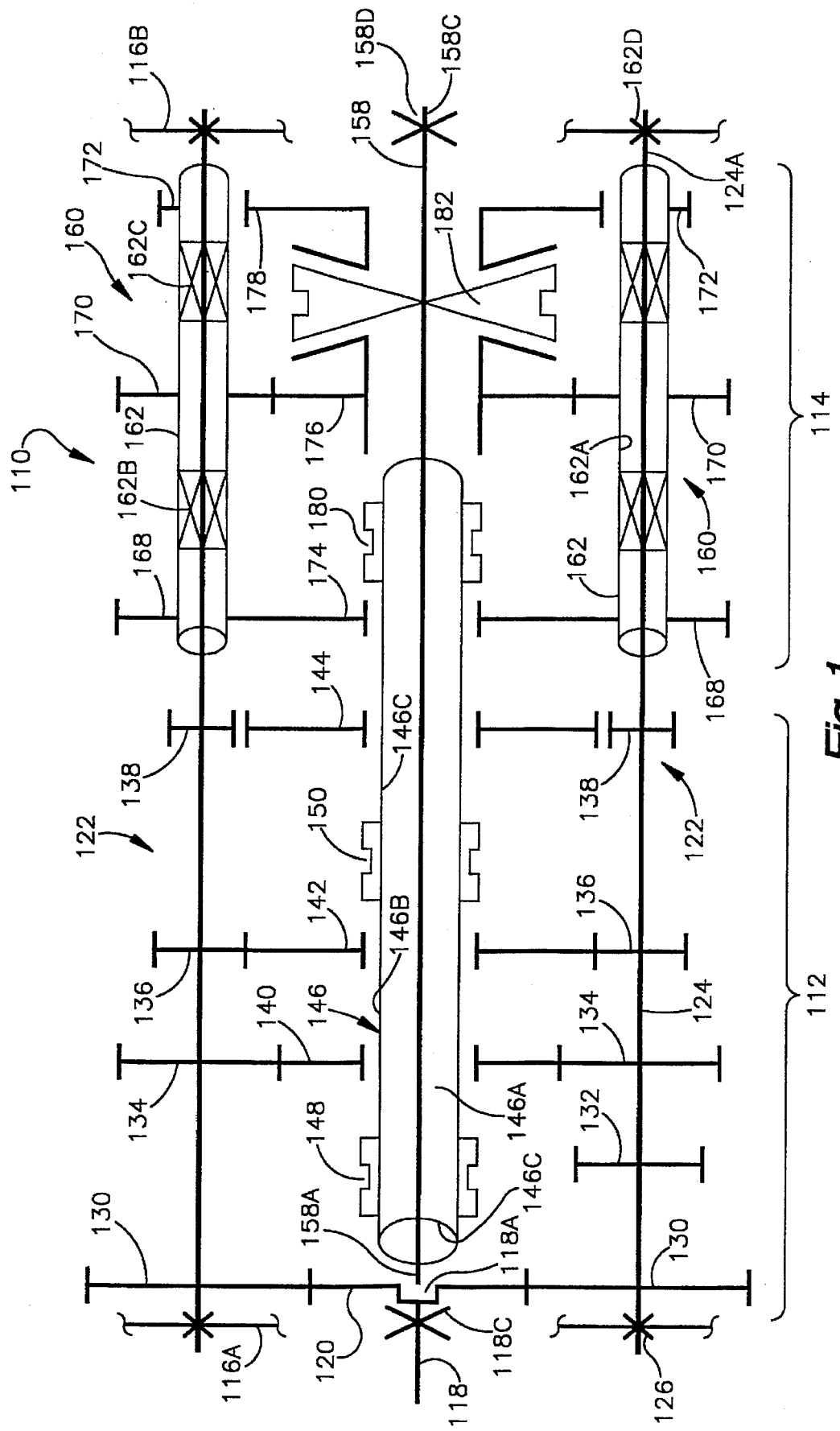
FIG. 1 is a schematic illustration of a compound splitter-type transmission utilizing the splitter shifting mechanism of the present invention.
Figure 2:
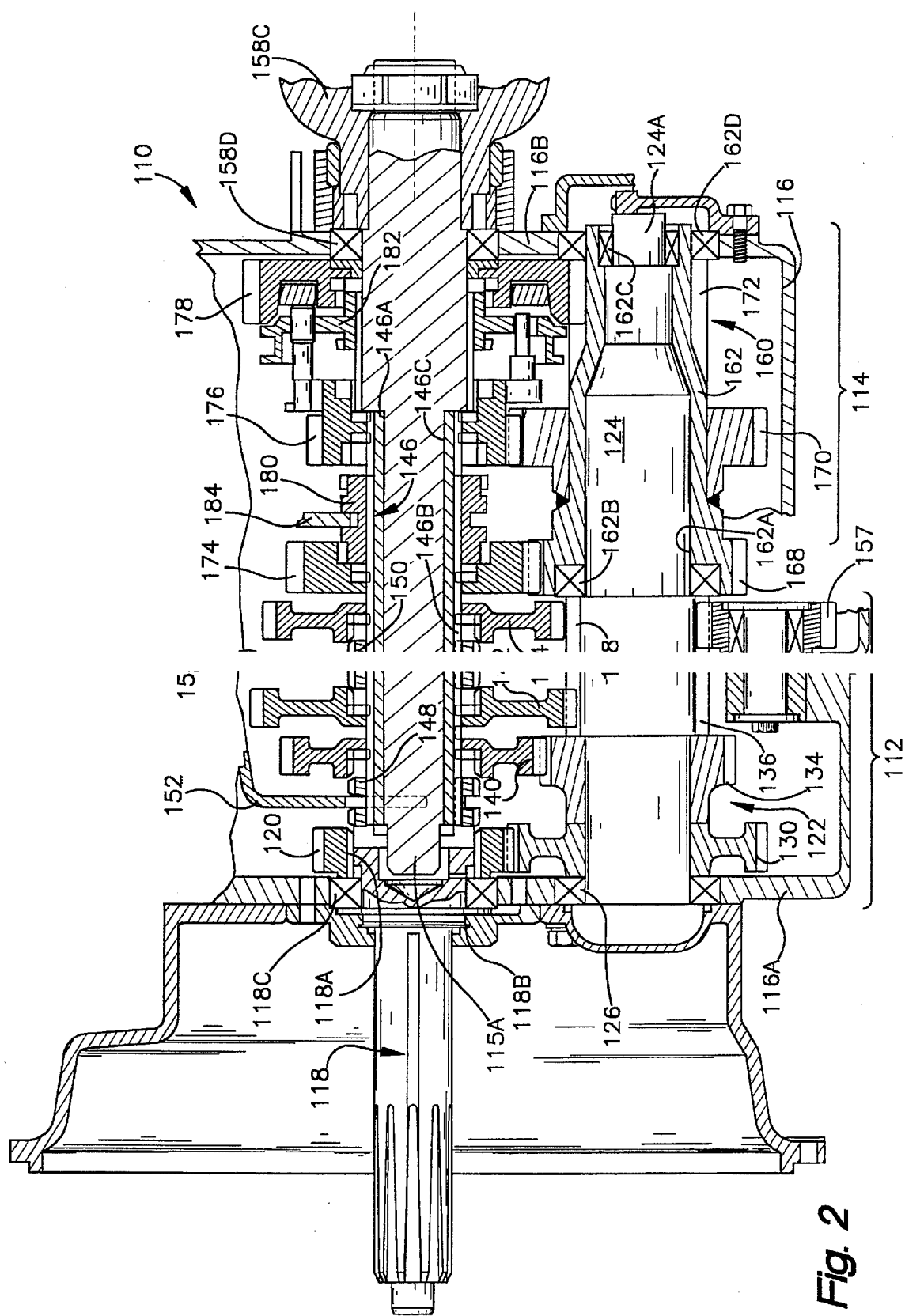
FIG. 2 is a sectional view of the transmission of FIG. 1.
Figure 3:
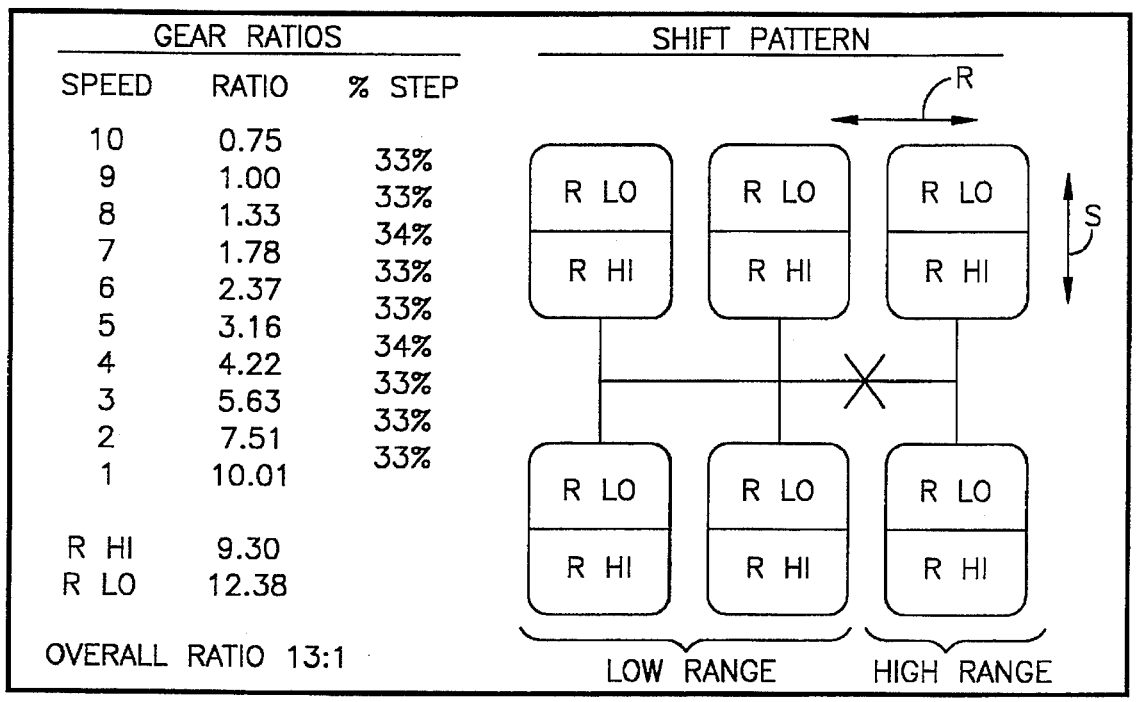
FIG. 3 illustrates a typical shift pattern and typical gear ratios for the transmission of FIGS. 1 and 2.

In FIGS. 1, 2 and 3, transmission 110 of the present invention is illustrated. Transmission 110 includes a main section 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shaft 118 is supported by bearing 118C in front end wall 116A, while the rearward end 158C of output shaft 158 is supported by bearing assembly 158D in rear end wall 116B. Bearing assembly 158D may be a pair of opposed taper bearings or a single roller or ball bearing, as is illustrated in FIG. 3.

The mainshaft 146, which carries mainshaft clutches 148 and 150, and the mainshaft splitter clutch 180 is in the form of a generally tubular body 146A having an externally splined outer surface 146B and an axially extending through bore 146C for passage of output shaft 158. Shift forks 152 and 154 are provided for shifting clutches 148 and 150, respectively. Mainshaft 146 is independently rotatable relative to input shaft 118 and output shaft 158 and preferably is free for limited radial movements relative thereto.

The main section 112 includes two substantially identical main section countershaft assemblies 122 each comprising a main section countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively.

Main section countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto, while synchronized range clutch 182 is fixed to output shaft 158 for selectively clutching either gear 176 or gear 178 thereto.

Auxiliary countershafts 162 are generally tubular in shape, defining a through bore 162A for receipt of the rearward extensions of the main section countershafts 124. Bearings or bushings 162B and 162C are provided to rotatably support auxiliary countershaft 162 on main section countershaft 124. Bearing 162D directly or indirectly supports the rear ends of countershafts 124 and 162 in the rear end wall 116B.

The splitter jaw clutch 180 is a two-position, non-synchronized clutch assembly which may be selectively positioned in the rightwardmost or leftwardmost positions for engaging either gear 176 or gear 174, respectively, to the mainshaft 146. Splitter jaw clutch 180 is axially positioned by means of a shift fork 184 controlled by a three-position piston actuator, which is responsive to a driver selection switch such as a button or the like on the shift knob, as is known in the prior art. Two-position synchronized range clutch assembly 182 is a two-position clutch which may be selectively positioned in either the rightwardmost or leftwardmost positions thereof for selectively clutching either gear 178 or 176, respectively, to output shaft 158. Clutch assembly 182 is positioned by means of a shift fork 188 operated by means of a two-position piston device.

As may be seen by reference to FIGS. 2 and 3, by selectively axially positioning both the splitter clutch 180 and the range clutch 182 in the forward and rearward axial positions thereof, four distinct ratios of mainshaft rotation to output shaft rotation may be provided. Accordingly, auxiliary transmission section 114 is a three-layer auxiliary section of the combined range and splitter type providing four selectable speeds or drive ratios between the input (mainshaft 146) and output (output shaft 158) thereof. The main section 112 provides a reverse and three potentially selectable forward speeds. However, one of the selectable main section forward gear ratios, the low-speed gear ratios associated with mainshaft gear 142, is not utilized in the high range. Thus, transmission 10 is properly designated as a "(2+1)×(2×2)" type transmission providing nine or ten selectable forward speeds, depending upon the desirability and practicality of splitting the low gear ratio.

The shift pattern for shifting transmission 110 is schematically illustrated in FIG. 3. Divisions in the vertical direction at each gear lever position signify splitter shifts, while movement in the horizontal direction from the 3/4 and 5/6 leg of the H pattern to the 7/8 and 9/10 leg of the H pattern signifies a shift from the low range to the high range of the transmission. As discussed above, splitter shifting is accomplished responsive to a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 3, and will be described in greater detail below. Range shift devices of this general type are known in the prior art and may be seen by reference to aforementioned U.S. Pat. Nos. 3,429,202; 4,455,883; 4,561,325 and 4,663,725.

Referring again to FIG. 3, and assuming it is desirable that a transmission have generally equal ratio steps, the main section ratio steps should be generally equal, the splitter step should be generally equal to the square root of the main section ratio steps, and the range step should equal about the main section ratio step raised to the $N^{TH}$ power where $N^{TH}$ equals the number of main section ratio steps occurring in both ranges (i.e., N=2 in the (2+1)×(2×2) transmission 10). Given the desired ideal ratios, gearing to approximate these ratios is selected. In the above example, the splitter steps are about 33.3%, while the range step is about 316%, which is generally suitable for a "2+1" main transmission section having about 78% steps, as the square root of 1.78 equals about 1.33 and 1.78 raised to the second power (i.e., N=2) equals about 3.16.

Transmissions similar to transmission 110 may be seen in greater detail by reference to aforementioned U.S. Pat. Nos. 4,754,665; 5,368,145; 5,370,013 and 5,390,561.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

As mentioned above, in the prior art, especially for manual transmissions, the splitter clutches were operated by two-position actuators and, thus, were provided with a relatively small backlash (i.e., about 0.008–0.012 inches backlash for a clutch having about a 3.6-inch pitch diameter) to prevent unduly harsh splitter shifting. Typically, with the above backlash and the usual engagement forces, at greater than about 60 RPM input shaft synchronous error, the clutch teeth would ratchet or "buzz" and clutch engagement would not occur.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

In change-gear transmissions utilizing the non-synchronized positive clutch structures, especially for heavy-duty vehicles, for a given total backlash (i.e., a given maximum allowably harsh clutch engagement), the range of asynchronous conditions at which the clutch members will engage is often narrower than desirable under certain conditions, making shifting more difficult.

According to the present invention, the interengaging clutch teeth provided on splitter clutch 180 and on splitter gear 174 and splitter/range gear 176 are of a relatively large backlash (i.e., about 0.020–0.060 inches for a 3.6-inch pitch diameter clutch), which will assure that almost any attempted splitter shift will be completed.

Figure 4:
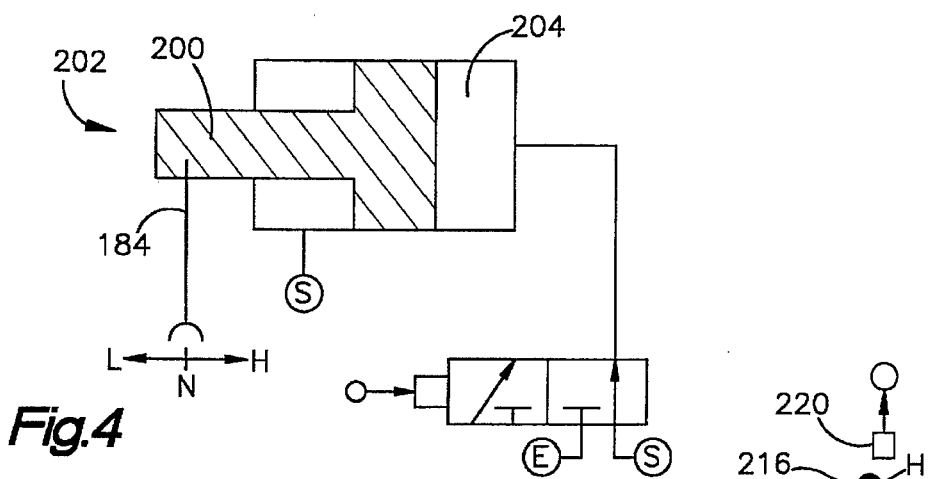
FIG. 4 is a schematic illustration of the splitter shifting mechanism of the present invention.

The clutch 180 is moved by a shift fork 184 attached to the piston rod 200 of the piston actuator assembly 202. Actuator assembly 202 may be a conventional three-position actuator (see U.S. Pat. No. 5,054,591, the disclosure of which is incorporated herein by reference) or an actuator of the type illustrated in co-pending U.S. Ser. No. 08/597,304 and FIG. 4, wherein pulse width modulation of a selectively pressurized and exhausted chamber 204 may be used to achieve the three positions (L, N, H) of the shift fork.

Figure 5:
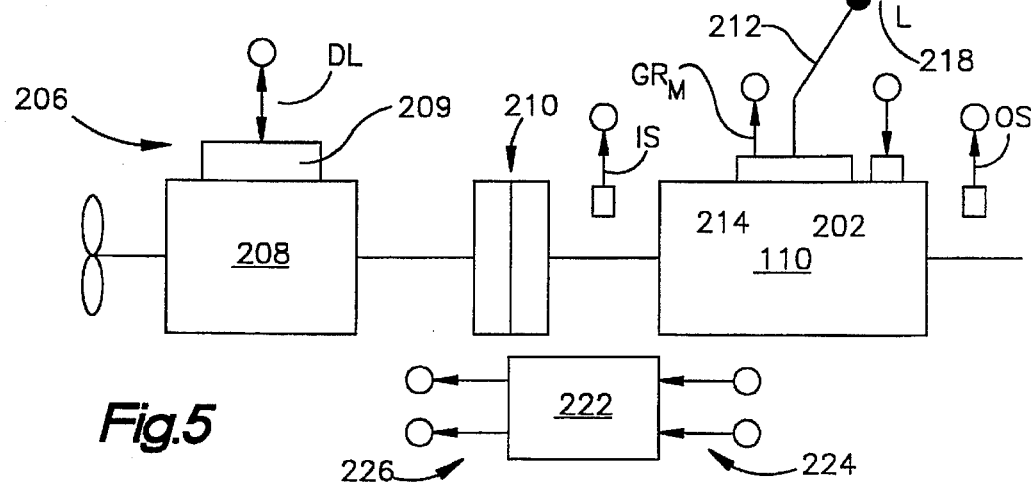
FIG. 5 is a schematic illustration of a transmission system utilizing the shifting mechanism and control of the present invention.

FIG. 5 illustrates a vehicular powertrain 206 utilizing the present invention. Powertrain 206 includes an internal combustion engine 208, a master clutch 210 and manually shifted transmission 110. A shift lever 212 operates a shift mechanism 214, such as a single shift shaft mechanism of the type illustrated in U.S. Pat. No. 4,920,815, the disclosure of which is incorporated herein by reference.

The shift lever 214 includes a knob 216 carrying a splitter master valve and selector 218 by which splitter high (H) or splitter low (L) may be selected. A sensor 220 senses the position of the selector switch and provides a signal indicative thereof.

A microprocessor-based controller 222 receives input signals 224 and processes same according to predetermined logic rules to issue command output signals 226 to various system actuators, including the splitter actuator 202. The microprocessor 222 may be of the type illustrated in U.S. Pat. No. 4,595,986, the disclosure of which is incorporated herein by reference.

The engine 208 may include an electronic controller 209 communicating over an electronic data link DL utilizing the SAE J-1922, SAE J-1939 and/or ISO 11898 protocol. Sensors also may be provided to provide input signals indicative of input shaft (IS) and/or output shaft (OS) rotational speeds and/or of the main section engaged ratio ($GR_M$).

The controller 222 is provided with logic rules under which a shift from splitter neutral into a selected target splitter ratio is initiated such that, under normal conditions, the synchronous error which is equal to input shaft rotational speed minus the product of output shaft rotational speed and transmission target gear ratio is expected to be equal to or less than a value selected to give smooth, high-quality shifts ((IS−(OS*GR))=ERROR≦REF). The timing is done in regard to sensed/expected shaft speeds, shaft acceleration/deceleration and actuator reaction times.

In certain situations, the logic rules will recognize operating conditions wherein the preferred synchronous window (i.e., IS=(OS*GR)±60 RPM) must be expanded to accomplish a splitter shift, even at the expense of shift quality. These situations, usually associated with upshifts, include if shifting attempted at low engine speeds wherein expected engine speed at shift completion will be undesirably low, if deceleration of the output shaft is relatively high (dOS/dt<REF) and/or if the absolute value of the synchronous error is not approaching the normal value at an acceptable rate.

While the logic is heavily biased to cause smooth, high-quality splitter shifting, if a smooth splitter shift does not appear obtainable, if possible, the logic will cause a shift (possibly a relatively rough shift) to be successfully completed.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A compound change-gear transmission system comprising a splitter-type compound transmission (110) having a main transmission section (112) connected in series with a splitter-type auxiliary transmission section (114), said splitter-type auxiliary section including a double-acting splitter clutch (180) carrying a first set of clutch teeth for engaging a first array of clutch teeth associated with a first splitter gear upon axial movement of said splitter clutch in a first axial direction to a first position, and a second set of clutch teeth for engaging a second array of clutch teeth associated with a second splitter gear upon axial movement of said splitter clutch in a second axial direction to a second axial position, said transmission system characterized by:

at least one of (i) said first set and first array of clutch teeth and (ii) said second set and second array of clutch teeth being non-synchronized and non-blocked and having a pitch diameter of at least 2.5 inches and defining a backlash exceeding 0.020 inches; and said splitter clutch controlled by a splitter actuator (202) effective to move said splitter clutch into and maintain said splitter clutch in said first and second positions and not a third position, intermediate said first and second positions, wherein both said first set and first array and said second set and second array of clutch teeth are not engaged.

2. The transmission system of claim 1 further comprising a shift lever for manual shifting of the main transmission section and a manual splitter selector switch for manual selection of engagement of either said first or said second splitter gear.

3. The transmission system of claim 2 further comprising a controller (222) for receiving input signals including a signal indicative of the position of said splitter selector switch and for processing same according to predetermined logic rules to issue command output signals to at least said splitter actuator.

4. A compound change-gear transmission system comprising a compound transmission having a main transmission section connected in series with an auxiliary transmission section, said auxiliary section including a double-acting auxiliary section clutch carrying a first set of clutch teeth for engaging a first array of clutch teeth associated with a first auxiliary section gear upon axial movement of said auxiliary section in a first axial direction to a first position, and a second set of clutch teeth for engaging a second array of clutch teeth associated with a second auxiliary section gear upon axial movement of said auxiliary section clutch in a second axial direction to a second axial position, said transmission system characterized by:

at least one of (i) said first set and first array of clutch teeth and (ii) said second set and second array of clutch teeth being non-synchronized and non-blocked and having a pitch diameter of at least 2.5 inches and defining a backlash exceeding 0.020 inches; and said auxiliary section clutch controlled by an auxiliary section actuator effective to move said auxiliary section clutch into and maintain said auxiliary section clutch in said first and second positions and not a third position, intermediate said first and second positions, wherein both said first set and first array and said second set and second array of clutch teeth are not engaged.

5. The transmission system of claim 4 further comprising a shift lever for manual shifting of the main transmission section and an auxiliary section selector switch for manual selection of engagement of either said first or said second auxiliary section gear.

6. The transmission system of claim 5 further comprising a controller for receiving input signals including a signal indicative of the position of said auxiliary section selector switch and for processing same according to predetermined logic rules to issue command output signals to at least said auxiliary section actuator.

7. The transmission system of claim 6 wherein said auxiliary section is a splitter-type auxiliary section.

8. The transmission system of claim 6 wherein said defined backlash exceeds 0.025 inches.

9. The transmission system of claim 6 wherein said defined backlash exceeds 0.036 inches.

* * * * *

UNITED STATES PATENT AND TRADEMARK OFFICE
CERTIFICATE OF CORRECTION

PATENT NO. : 5,651,292
DATED : JULY 29, 1997
INVENTOR(S) : THOMAS A. GENISE

It is certified that error appears in the above-identified patent and that said Letters Patent is hereby corrected as shown below:

COLUMN 6, LINE 4, DELETE "not" AND INSERT -- into --

COLUMN 6, LINE 41, DELETE "not" AND INSERT -- into --.

Signed and Sealed this

Thirty-first Day of March, 1998

*Attest:*

BRUCE LEHMAN

*Attesting Officer*      *Commissioner of Patents and Trademarks*